US011410561B2

(12) United States Patent
Kadavil et al.

(10) Patent No.: US 11,410,561 B2
(45) Date of Patent: Aug. 9, 2022

(54) TRAFFIC MANAGEMENT SYSTEMS AND METHODS FOR UNMANNED AERIAL VEHICLES

(71) Applicant: HONEYWELL INTERNATIONAL INC., Morris Plains, NJ (US)

(72) Inventors: Navin Kadavil, Bangalore (IN); Aswathy Praveena Sukumaran, Bangalore (IN); Roshan Prasad, Bangalore (IN); Amber Bhardwaj, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 182 days.

(21) Appl. No.: 16/894,126

(22) Filed: Jun. 5, 2020

(65) Prior Publication Data

US 2021/0312818 A1    Oct. 7, 2021

(30) Foreign Application Priority Data

Apr. 6, 2020    (IN) .............................. 202011015104

(51) Int. Cl.
*G08G 5/00* (2006.01)
*G05D 1/10* (2006.01)
*G08G 5/04* (2006.01)

(52) U.S. Cl.
CPC .......... *G08G 5/0034* (2013.01); *G05D 1/104* (2013.01); *G08G 5/0069* (2013.01); *G05D 1/1064* (2019.05); *G08G 5/045* (2013.01)

(58) Field of Classification Search
CPC ..... G08G 5/0034; G08G 5/0069; G05D 1/104
(Continued)

(56) References Cited

U.S. PATENT DOCUMENTS 9,104,201 B1 * 8/2015 Pillai .................... G08G 5/0026
9,489,852 B1   11/2016 Chambers et al.
(Continued)

FOREIGN PATENT DOCUMENTS

CN    109857139 A    6/2019
JP    2017120534 A  * 7/2017

OTHER PUBLICATIONS

Wang, Haijun et al., "Survey on Unmanned Aerial Vehicle Networks: A Cyber Physical System Perspective," downloaded on Feb. 6, 2020.

(Continued)

*Primary Examiner* — Isaac G Smith
(74) *Attorney, Agent, or Firm* — Lorenz & Kopf, LLP

(57) ABSTRACT

Systems and methods are disclosed for traffic management for unmanned aerial vehicles (UAVs). The systems and methods define a network of waypoint computing devices having traffic corridors connecting the waypoint computing devices. Systems and methods receive suspend calls and initiate calls from waypoint computing devices and dynamically update the network so as to include additional waypoint computing devices and traffic corridor connections based on the initiate calls and to remove from the network waypoint computing devices and associated traffic corridors based on the suspend calls. The systems and methods determine a flight plan for the UAV in response to a request based on the updated network. The flight plan includes a plurality of traffic corridors connecting source and destination global coordinates included in the request. The systems and methods provide a response to the UAV including the flight plan.

14 Claims, 4 Drawing Sheets

(58) Field of Classification Search
USPC .......................................................... 701/120
See application file for complete search history.

(56) References Cited

U.S. PATENT DOCUMENTS

| | | | |
|---|---|---|---|
| 9,494,937 | B2 | 11/2016 | Siegel et al. |
| 10,360,803 | B2 | 7/2019 | Postrel |
| 10,395,542 | B2 | 8/2019 | Yakan |
| 10,410,532 | B1 | 9/2019 | Myr |
| 10,450,091 | B2* | 10/2019 | McMillian ................ B64F 1/32 |
| 2014/0032034 | A1 | 1/2014 | Raptopoulos et al. |
| 2016/0012730 | A1* | 1/2016 | Jarrell .................. G08G 5/0069 701/4 |
| 2016/0028422 | A1 | 1/2016 | Shimizu et al. |
| 2016/0371985 | A1* | 12/2016 | Kotecha ............... G01C 21/005 |
| 2017/0069214 | A1 | 3/2017 | Dupray et al. |
| 2017/0267343 | A1* | 9/2017 | Chen ................... G08G 5/0026 |
| 2017/0278405 | A1 | 9/2017 | Yakan |
| 2018/0033315 | A1* | 2/2018 | Winkle ................. B60L 53/305 |
| 2018/0061251 | A1* | 3/2018 | Venkatraman .......... B64C 39/02 |
| 2018/0218614 | A1* | 8/2018 | Macfarlane .......... G05D 1/0011 |
| 2018/0275647 | A1 | 9/2018 | Li et al. |
| 2019/0043368 | A1 | 2/2019 | Priest |
| 2019/0108472 | A1 | 4/2019 | Sweeney et al. |
| 2019/0332105 | A1 | 10/2019 | Sant et al. |
| 2019/0340934 | A1 | 11/2019 | Villa et al. |
| 2019/0385463 | A1 | 12/2019 | Cantrell |
| 2021/0125507 | A1* | 4/2021 | Haider ................ G08G 5/0082 |

OTHER PUBLICATIONS

Pascarelli, Claudio et al., "Environment for Planning Unmanned Aerial Vehicles Operations," Aerospace 2019, www.mdpi.com/journal/aerospance, May 4, 2019.

* cited by examiner

TRAFFIC MANAGEMENT SYSTEMS AND METHODS FOR UNMANNED AERIAL VEHICLES

CROSS REFERENCE TO RELATED APPLICATION

This application claims priority to Indian Provisional Patent Application No. 202011015104, filed Apr. 6, 2020, the entire content of which is incorporated by reference herein.

TECHNICAL FIELD

The present disclosure generally relates to systems and methods for traffic management for unmanned aerial vehicles (UAVs). The present disclosure more particularly relates to determining flight plans in response to requests from UAVs.

BACKGROUND

In 2019, the Federal Aviation Administration (FAA) projected in its annual forecast that the number of commercial UAVs in the sky could triple by 2023. Companies are beginning to incorporate UAVs (or drones) into their operations. The industry faces operational challenges when integrating UAVs and piloted aircraft into existing airspace. The FAA, NASA, and other federal partner agencies are collaborating to explore concepts of operation, data exchange requirements, and a supporting structure to enable multiple beyond visual line-of-sight UAV operations at low altitudes (under 400 feet above ground level (AGL)) in airspace where FAA air traffic services are not provided. Research and testing will identify airspace operations requirements to enable safe visual, and beyond visual, line-of-sight UAV flights in low-altitude airspace.

Many beneficial civilian applications of UAVs have been proposed, from goods delivery and infrastructure surveillance, to search and rescue, and agricultural monitoring. Currently, there is no established infrastructure to enable, and safely manage, the widespread use of low-altitude airspace and UAV operations, regardless of the type of UAV. A UAV traffic management (UTM) system for low-altitude airspace is necessary.

Accordingly, it is desirable to provide systems and methods for UAV traffic management. In addition, it is desirable to provide systems and methods for UAV traffic management that determines flight plans for UAVs and that avoid collisions, minimize traffic congestion and ensure accountability. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for traffic management for unmanned aerial vehicles (UAVs). The systems and methods define a network of waypoint computing devices having traffic corridors connecting the waypoint computing devices. Systems and methods receive suspend calls and initiate calls from waypoint computing devices and dynamically update the network so as to include additional waypoint computing devices and traffic corridor connections based on the initiate calls and to remove from the network waypoint computing devices and associated traffic corridors based on the suspend calls. The systems and methods determine a flight plan for the UAV in response to a request based on the updated network. The flight plan includes a plurality of traffic corridors connecting source and destination global coordinates included in the request. The systems and methods provide a response to the UAV including the flight plan.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
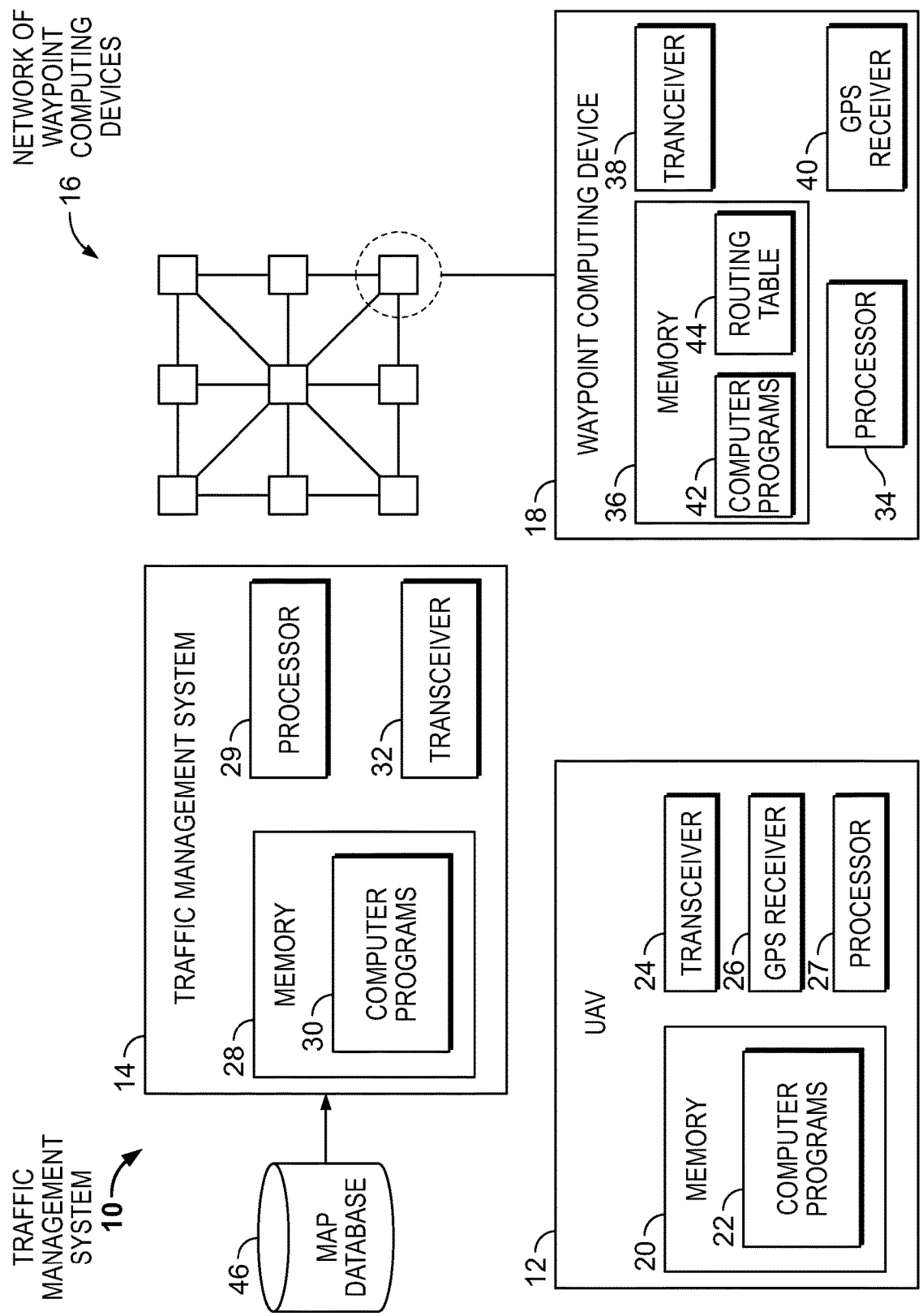
FIG. 1 illustrates a block diagram of a traffic management system for UAVs, in accordance with various exemplary embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and/or modules, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components and modules shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments or programming instructions are described as a computer program stored in a tangible processor-readable medium or memory, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Commercial UAVs may have random take off positions, varying payloads and distributed roof top landing pads. UAVs with passenger traffic may require take-off and landing at designated landing pads. The present disclosure provides, in some embodiments, systems and methods to plan entry and exit to/from a traffic flow and to optimize the traffic flow. Systems and methods described herein provide software that connects waypoints into a network. A flight path between any two waypoints in the network is determined based on network performance parameters. The network performance parameters can be used to optimize the flight path and traffic flow through the network. The network performance parameters from various pairs of waypoints can be connected and scaled into a flight plan.

In embodiments, one or more landing pads and a waypoint computing device is located on a building and form part of a network of waypoints. Two waypoint computing devices (usually neighboring) make a software connection to build a traffic corridor. A trajectory of any UAV is predictable along the traffic corridors. In embodiments, a UAV registers with a nearby waypoint computing device located on a building (associated with a building ID) before take-off. The UAV sends a flight plan request including source and destination coordinates and the traffic management system determines and allocates a flight plan with an optimized trajectory. The trajectory is optimized based on network performance parameters to optimize traffic flow.

In embodiments, more than two waypoint computing devices are connected to define a network. Waypoint computing devices can join the network and exit the network through initiate and suspend calls. The traffic management system keeps an updated record of waypoint computing devices making up the network. UAVs also utilize the network as needed. Landing pads may be available on or at commercial and/or residential buildings. The waypoint computing devices can self-initiate onto the network through an initiate call to a traffic management computer. The traffic management computer designates a location of the building associated with the waypoint computing device with a traffic waypoint. The waypoint computing devices are connected by defined traffic corridors. Addition of waypoint computing devices and associated traffic corridors allow the network to grow exponentially across a city.

In embodiments, a routing algorithm provides a connected list of traffic corridors for the flight plan. Further, the routing algorithm re-computes the flight plan at each traffic corridor transition in order to maintain the optimal path based on network performance, thereby reducing travel times and efficiently utilizing the network. The routing algorithm uses various network performance parameters for each traffic corridor and formulates cost vectors embodying the network performance parameters. The routing algorithm minimizes the sum of cost vectors in determining the flight plan. The network performance parameters include number of hops (hop count), speed of the traffic corridor, congestion/conditions for the traffic corridor, latency (delay), traffic corridor bandwidth, and any emergency. The routing algorithm places emphasis on traffic throughput when determining a flight plan. According to embodiments of the present disclosure, a UAV is commanded to leave traffic corridors during any emergency for the UAV to allow other traffic to proceed. Hovering is not permitted in the traffic corridors.

Figure 2:
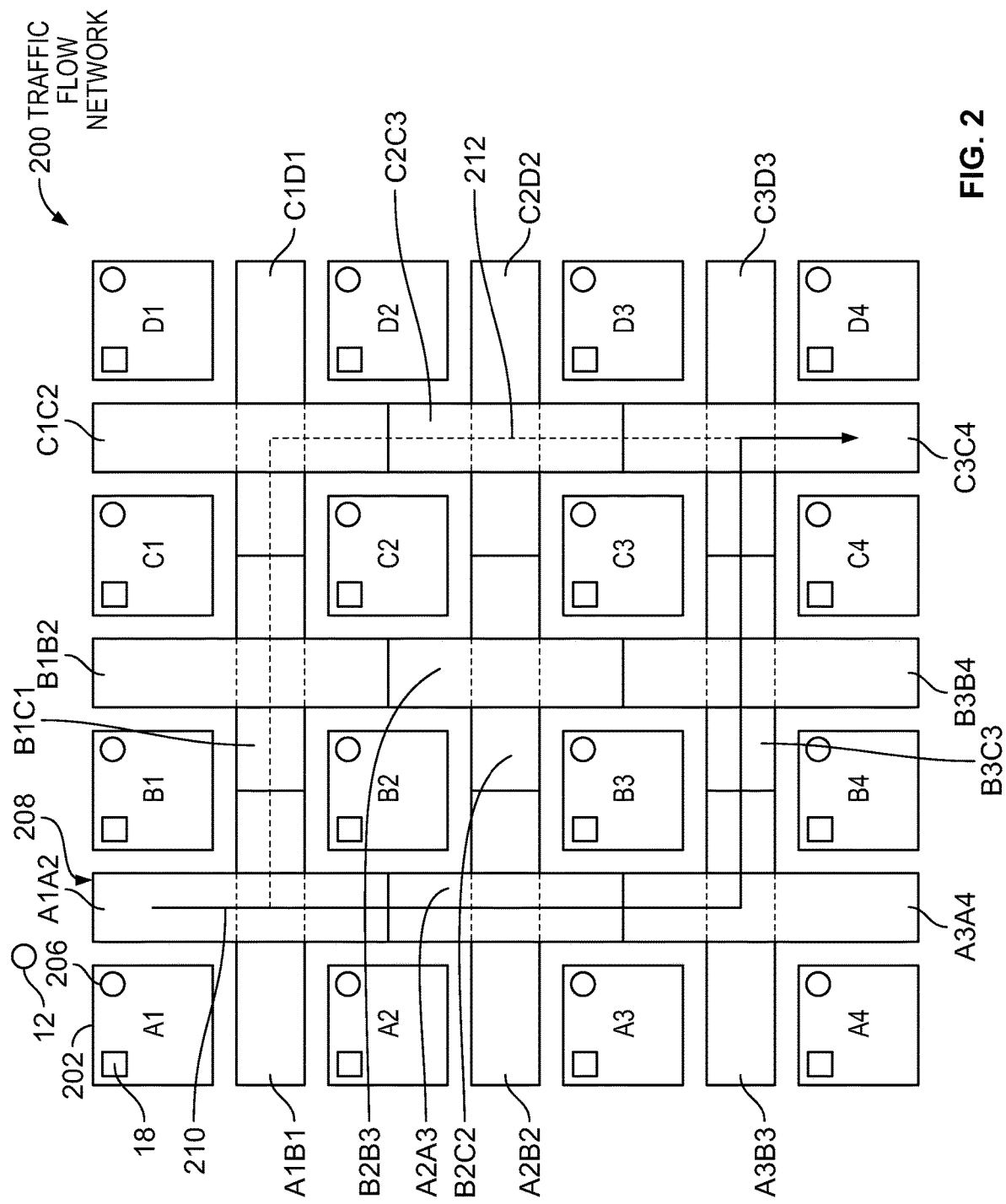
FIG. 2 illustrates a block diagram showing buildings, waypoint computing devices and traffic corridors, in accordance with various exemplary embodiments.

FIG. 1 illustrates a block diagram of a traffic management system 10 including a traffic management computer 14, a UAV 12 and a network 16 of waypoint computing devices 18, in accordance with an embodiment. FIG. 2 illustrates a block diagram of an exemplary traffic flow network 200 including waypoint computing devices 18 located on respective buildings 202 that have landing pads 206. Traffic corridors 208 are defined between buildings 202 by the traffic management system 10, as described further herein.

Continuing to refer to FIGS. 1 and 2, the waypoint computing devices 18 include a memory 36, a processor 34, and a global positioning system (GPS) receiver and a transceiver 38. The memory 36 has one or more computer programs 42 stored thereon that are executed by the processor 34 in order to perform the various functions described herein with respect to the waypoint computing devices 18.

In embodiments, the waypoint computing devices 18 send initiate calls to the traffic management computer 14 as part of a request to join the network 16 of waypoint computing devices 18. The request is sent by the transceiver 38 through a cellular data connection or through a wired or wireless (e.g. wireless router such as WiFi) internet connection. The request may include a location (e.g. latitude and longitude) of a building 202 on which the waypoint computing device 18 is located. The location of the building 202 can be determined through the GPS receiver 40 or through other geolocation systems such as a WiFi positioning system. In other embodiments, the location of the building 202 is preset in the waypoint computing device 18. When more accurate location is required, differential GPS technology may be used. In yet further embodiments, a combination of one or more map databases and detected location data is utilized to accurately determine the location of the building 202. A combination of such methods is also envisaged. The request may further include an identification of a number of landing pads 206 on the building 202 and optionally also a location of each landing pad in terms of altitude, latitude and longitude (or relative location with respect to each other and with respect to the building location), which may be retrieved from the memory 36. In some embodiments, the traffic management computer 14 responds with a building identifier that is stored by the waypoint computing device 18 in memory 36 and which is used to identify the waypoint computing device 18 in further communications with the traffic management computer 14.

In embodiments, the waypoint computing devices 18 send suspend calls when a waypoint computing device 18 (and its associated building 202) is to drop off the network 16. The waypoint computing devices 18 may send the suspend call to the traffic management computer 14 when all of the landing pads 206 for the building 202 associated with the waypoint computing device 18 are occupied or when there is an emergency at the building 202 such as a medical emergency (e.g. a passenger taken ill), a traffic emergency (e.g. a UAV crash) or a building emergency (e.g. a fire alarm).

In embodiments, the waypoint computing devices 18 each store and update a routing table 44. The routing table 44 is a database that keeps track of paths, like a map, and uses these to respond to requests from UAVs to determine a flight plan. The waypoint computing devices 18 compute cost vectors for each traffic corridor 208 connecting a waypoint computing device 18 to a neighboring waypoint computing device 18. The cost vectors include a measure of throughput for the traffic corridor. The cost vectors include at least one of the following metrics (or network performance parameters): length of the traffic corridor (in distance), average time to traverse the traffic corridor or traffic corridor delay, inverse of path bandwidth, and traffic congestion. The waypoint computing devices 18 monitor such network performance parameters through each UAV communicating, via its transceiver 24, with the waypoint computing device 18 when entering and exiting its one or more traffic corridors 208.

Each waypoint computing device 18 updates its own routing table 44 based on changes to the network performance parameters affecting the cost vectors for any traffic corridors 208 connecting to its neighbors. Further, each waypoint computing device 18 receives routing tables 44 from its neighboring waypoint computing devices 18 and sends its own routing table 44 to neighboring waypoint computing devices 18. In this way, the routing tables 44 of each waypoint computing device 18 are updated by calculating cost vector changes based on changing network performance parameters with respect to traffic corridors connecting to neighboring waypoint computing devices 18 and by receiving further afield information from updated routing tables received from neighboring waypoint computing devices 18.

With reference to FIG. 2, the waypoint computing device 18 of building A1 can update cost vectors in its own routing table 44 by monitoring network performance parameters for traffic corridors A1A2 and A1B1 and can receive updated cost vectors based on routing tables 44 received from waypoint computing devices 18 of buildings A2, B2 and B1. By continually updating the routing tables 44 in this way, the cost vectors for the whole network 16 are updated by propagation of updated routing tables 44 sent to each neighbor. This propagation algorithm allows each routing table 44 of each waypoint computing device 18 to, eventually, have updated status information for the cost vectors for each traffic corridor 208.

Figure 4:
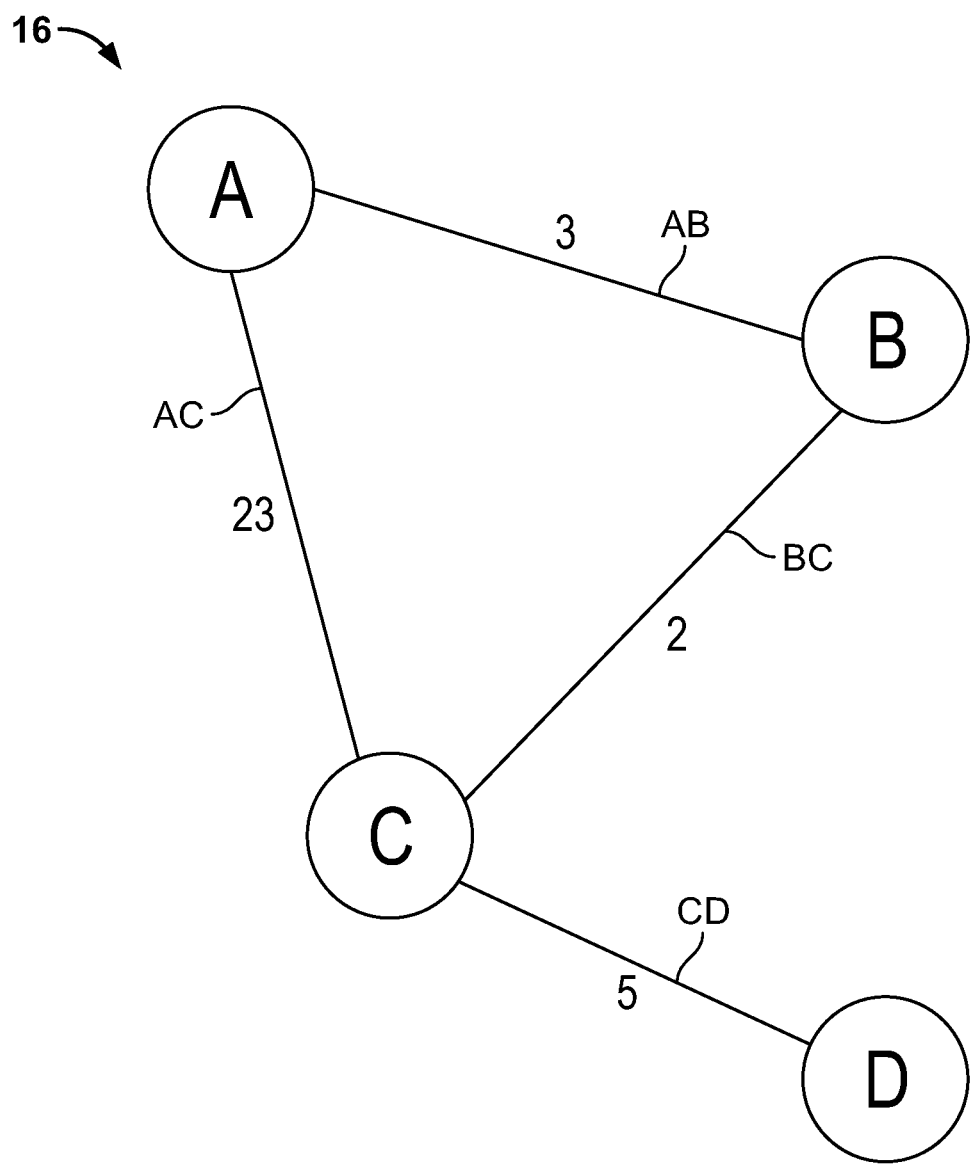
FIG. 4 is a representation of a network of waypoint computing devices, traffic corridors and waypoint computing devices, in accordance with various embodiments.

With reference to FIG. 4, a simplistic example of cost vector propagation will be provided. FIG. 4 illustrates a simplified network 16 of waypoint computing devices A to D that are connected by traffic corridors AB, AC, BC and CD. Each traffic corridor is associated with a cost vector, which is represented by a single real number. Thus, traffic corridor AB has a cost vector of 3, traffic corridor AC has a cost vector of 23, traffic corridor BC has a cost vector of 2 and traffic corridor CD has a cost vector of 5.

Beginning at time 0, or T=0, cost matrices are created for each waypoint computing device 18 to its immediate neighbors based on network performance parameters. In this way, the cost vectors shown in FIG. 4 are established. The following routing tables 1 to 4 are established by each waypoint computing device 18. Shortest path or minimum cost vector routes are highlighted in bold.

TABLE 1

| From A | Via A | Via B | Via C | Via D |
|---|---|---|---|---|
| To A | | | | |
| To B | | 3 | | |

TABLE 1-continued

| From A | Via A | Via B | Via C | Via D |
|---|---|---|---|---|
| To C | | | 23 | |
| To D | | | | |

TABLE 2

| From B | Via A | Via B | Via C | Via D |
|---|---|---|---|---|
| To A | 3 | | | |
| To B | | | | |
| To C | | | 2 | |
| To D | | | | |

TABLE 3

| From C | Via A | Via B | Via C | Via D |
|---|---|---|---|---|
| To A | 23 | | | |
| To B | | 2 | | |
| To C | | | | |
| To D | | | | 5 |

TABLE 4

| From D | Via A | Via B | Via C | Via D |
|---|---|---|---|---|
| To A | | | | |
| To B | | | | |
| To C | | | 5 | |
| To D | | | | |

At time T=1, all the waypoint computing devices broadcast, via transceiver 38, their cost vectors to all their neighbors: A to B and C, B to C and A, C to A, B, and D, and D to C. As each of these neighbors receives this information, the waypoint computing devices recalculate the shortest path (minimum cost vector) to each destination and update the routing tables 44. For example: A receives a cost vector from C that tells A there is a path via C to D, with a cost (or distance) of 5. Since the current lowest cost to C is 23, then A knows it has a path to D that costs 23+5=28. As there are no other shorter paths that A knows about, it puts this as its current estimate for the shortest-path from itself (A) to D, via C. After time T=1, the routing tables are updated as follows:

TABLE 5

| From A | Via A | Via B | Via C | Via D |
|---|---|---|---|---|
| To A | | | | |
| To B | | 3 | 25 | |
| To C | | 5 | 23 | |
| To D | | | 28 | |

TABLE 6

| From B | Via A | Via B | Via C | Via D |
|---|---|---|---|---|
| To A | 3 | | 25 | |
| To B | | | | |
| To C | 26 | | 2 | |
| To D | | | 7 | |

TABLE 7

| From C | Via A | Via B | Via C | Via D |
|---|---|---|---|---|
| To A | 23 | 5 | | |
| To B | 26 | 2 | | |
| To C | | | | |
| To D | | | | 5 |

TABLE 8

| From D | Via A | Via B | Via C | Via D |
|---|---|---|---|---|
| To A | | | 28 | |
| To B | | | 7 | |
| To C | | | 5 | |
| To D | | | | |

All the waypoint computing devices 18 have gained in the last iteration (at T=1) new shortest paths or minimum cost vectors. The waypoint computing devices 18 again broadcast (at time T=2) their updated routing tables to their neighbors, which prompts each neighbor to re-calculate their shortest distances (lowest costs) again. For instance: A receives a cost vector from B that tells A there is a path via C to D, with a cost (or distance) of 7. Since the current "shortest-path" to B is 3, then A knows it has a path to D that costs 7+3=10. This path to D of length 10 (via B) is shorter than the existing "shortest-path" to D of length 28 (via C), so it becomes the new "shortest-path" to D. After time T=2, the routing tables recalculated as follows:

TABLE 9

| From A | Via A | Via B | Via C | Via D |
|---|---|---|---|---|
| To A | | | | |
| To B | | 3 | 25 | |
| To C | | 5 | 23 | |
| To D | | 10 | 28 | |

TABLE 10

| From B | Via A | Via B | Via C | Via D |
|---|---|---|---|---|
| To A | 3 | | 7 | |
| To B | | | | |
| To C | 8 | | 2 | |
| To D | 31 | | 7 | |

TABLE 11

| From C | Via A | Via B | Via C | Via D |
|---|---|---|---|---|
| To A | 23 | 5 | | 33 |
| To B | 26 | 2 | | 12 |
| To C | | | | |
| To D | 51 | 9 | | 5 |

TABLE 12

| From D | Via A | Via B | Via C | Via D |
|---|---|---|---|---|
| To A | | | 10 | |
| To B | | | 7 | |
| To C | | | 5 | |
| To D | | | | |

This time, only routers A and D have new shortest-paths (minimum costs) for their cost vectors. As such, A and D broadcast their new cost vectors to their neighbors: A broadcasts to B and C, and D broadcasts to C. This causes each of the neighbors receiving the new cost vectors to re-calculate their shortest paths. However, since the information from the cost vectors does not yield any shorter paths than they already have in their routing tables 44, then there are no changes to the routing tables. As such, none of the waypoint computing devices 18 have any new shortest-paths to broadcast. Therefore, none of the waypoint computing devices 18 receive any new information that might change their routing tables 44. The algorithm comes to a stop until new cost vector information is received (such as through a waypoint computing device 18 determining that its own traffic corridors 208 has a change in cost vector based on detected network performance parameters). When new cost vector information is obtained that results in a new minimum cost vector path, the new cost vector information is propagated throughout the network 16 by each waypoint computing device transmitting its routing table 44 (or affected part thereof) to neighboring waypoint computing devices 18. The neighboring waypoint computing devices 18 re-compute minimum cost vector paths and send the updated routing tables to its neighbors and so on until all routing tables 44 in the network 16 are brought up to date.

In embodiments, the waypoint computing devices 18 receive information from the traffic management computer 14 reporting when waypoint computing devices 18 are to be added to the network 16 and when waypoint computing devices 18 are to be removed from the network 16. The information may include a description of new traffic corridors and neighboring waypoint computing devices 18 for additional waypoint computing devices and a description of traffic corridors that are to be removed from the network 16 for removal of waypoint computing devices from the network 16. The waypoint computing devices 18 will recalculate its cost vectors and update the routing tables 44 to reflect new and removed waypoint computing devices 18. The updated cost vectors and routing tables 44 are propagated throughout the network 16 in the manner described above.

In embodiments, the waypoint computing devices 18 receive requests from UAVs 12 for a flight plan. The requests include at least source and destination global coordinates. The source and destination global coordinates may be absolute coordinates or a building or waypoint computing device identifier. Additional information included in each request includes at least one of: estimated start time, number of passengers, take-off weight, flight ID and UAV registration number. For a particular UAV, the closest waypoint computing device 18 is engaged with the request. The waypoint computing device 18 engaged with the request responds with a flight plan that has been selected using the routing tables, specifically so as to select the lowest cost path to the destination included in the routing table. This lowest cost represents a measure at least one of speed of traffic throughput and is an accumulation of costs for each traffic corridor 208 on the route from the receiving waypoint computing device 18 to the destination waypoint computing device 18. The waypoint computing device 18 receiving the request responds with at least a list of flight legs made up of traffic corridors (e.g. traffic corridor identifiers). Additional information included in the response includes at least one of: flight ID, source GPS, destination GPS, maximum altitude, minimum altitude, and number of flight legs. Additional information included with respect to each flight leg includes at least one of: altitude, source building ID (or global coordinates), end building ID (or global coordinates), estimated start time, estimated end time, en route traffic management computer ID (where there is more than one traffic management computer 14).

In accordance with various embodiments, the traffic management computer 14 has a processor 29, a transceiver 32, a memory 28 and one or more computer programs 30 stored on the memory 28 that are executable by the processor 29 to perform the functions and method steps of the traffic management computer 14. The traffic management computer 14 maintains and dynamically updates the network 16 of waypoint computing devices 18. The traffic management computer 14 receives one or more initiate calls, via the transceiver 32, from one or more waypoint computing devices 18 requesting to join (or re-join) the network 16. The traffic management computer 14 determines neighboring waypoint computing devices 18 in the network 16 based on global coordinates included in the initiate call and global coordinates of waypoint computing devices 18. In embodiments, the traffic management computer 14 retrieves three-dimensional (latitude, longitude and altitude) map data from a map database 46 that describes airspace with respect to buildings in a geographic location of relevance to the network 16 (e.g. a city). The traffic management computer 14 defines one or more traffic corridors 208 connecting the new waypoint computing device with at least one neighboring waypoint computing device 18 already in the network 16 using airspace information from the map database 46. In particular, the traffic corridors 208 should be defined so as to avoid obstacles including buildings and to include a safety buffer from the buildings. The traffic management computer 14 defines, in embodiments, a traffic corridor 208 using a lateral range (minimum and maximum) and an altitude range (minimum and maximum) and a longitudinal range (maximum and minimum—defined from a position adjacent to the new waypoint computing device 18 (and its associated building 202) to a position adjacent to a neighboring waypoint computing device 18 already in the network 16). The traffic management computer 14 provides the new waypoint computing device 18 with an identifier for use in communicating with the traffic management computer 14. The identifier may be a building ID or a waypoint computing device ID. The traffic management computer 14 or the new waypoint computing device 18 itself propagates data (waypoint computing device identifier, neighboring waypoint computing devices, etc.) concerning the new waypoint computing device 18 by updating the routing tables 44 throughout the network 16 using the propagation scheme described above.

In embodiments, the traffic management computer 14 receives one or more suspend calls from one or more waypoint computing devices 18. The traffic management computer 14 maintains a dynamically updated record of network 16 including locations of all waypoint computing devices 18 and all locations and dimensions of traffic corridors 208 connecting the waypoint computing devices 18. The suspend call includes the identifier of the waypoint computing device 18 or building 202 to be removed from the network 16. The traffic management computer 14 removes the waypoint computing device 18 and traffic corridors 208 emanating therefrom to neighboring waypoint computing devices 18 from the network 16. The traffic management computer 14 or neighboring waypoint computing devices 18 propagate data (waypoint computing device identifier, neighboring waypoint computing devices, etc.) concerning the removed waypoint computing device 18 by updating the routing tables 44 throughout the network 16 using the propagation scheme described above.

The UAV 12 includes a memory 20, one or more computer programs 22, a transceiver 24 and a GPS receiver 26. The UAV 12 is an aircraft without a human pilot on board, although passengers may be onboard. The UAV 12 may have a ground-based controller, and a system of communications between the controller and the UAV 12. In other embodiments, the UAV 12 is autonomous using onboard computers to control flight. The UAV 12 may be a rotorcraft. The UAV 12 may be electrically powered, combustible fuel powered or a hybrid thereof. The processor 27 of UAV executes one or more computer programs 22 stored on the memory 20 to perform the functions and methods described herein. The UAV 12 communicates with the waypoint computing devices 18 via the transceiver 24.

In embodiments, the UAVs 12 send, via transceivers 24, flight plan requests to proximal waypoint computing devices 18. The transceivers 24 may operate through radiofrequency or microwave frequency broadcasts and/or through cellular or router-based internet connectivity. In one example, the UAV 12 transmits its location, obtained from the GPS receiver 26, to traffic management computer 14 and requests a location of a nearest waypoint computing device 18. The location may be determined by other sensors such as Wifi location sensing, ground based location beacons, image-based localization and combinations thereof. The traffic management computer 14 responds with the location of a nearest waypoint computing device 18 based on its current record of the network 16. In another embodiment, the UAV 12 is regularly updated with the record of the network 16 by the traffic management computer and selects a nearest waypoint computing device 12.

The UAV 12 transmits, as part of the request for a flight plan, the start location (which is usually the current location obtained via the GPS receiver 26) and a destination location, which is mission dependent, to the proximal waypoint computing device 18. The proximal waypoint computing device 18 is responsive to the request to determine the flight plan based on the combination of traffic corridors 208 having the lowest total cost vectors from the source to the destination, which is determined by looking up the routing table 44, which has been described in more detail above. Other factors may be taken into consideration when drawing up the flight plan. As should be clear, network performance parameters (such as throughput (e.g. minimizing time for each journey and maximizing quantity of journeys)) are favored in determining the flight plan such that shortest distance is not always the selected flight plan since the shortest distance may not factor in traffic corridor bandwidth, traffic corridor congestion, traffic corridor speed, etc. Other factors included as part of flight plan determination are remaining fuel, maximum permissible time for journey and space requirements of the UAV 12. These additional factors may be transmitted by UAV 12 to proximal waypoint computing device 18.

The proximal waypoint computing device 18 may respond with a list of flight legs, which correspond to traffic corridor identifiers. The UAV 12 may retrieve the geography of each listed traffic corridor 208 from an updated record of the network 16 from onboard memory 20 (which has been obtained from traffic management computer 14) or from the traffic management computer 14 in response to a request for traffic corridor data. The geography of each traffic corridor 208 includes permissible lateral range, permissible altitude range and longitudinal range. In some embodiments, the UAV 12 retrieves the traffic corridor geography before commencing the flight. In other embodiments, the UAV 12 retrieves the traffic corridor geography from the traffic computer 14 at each traffic corridor transition along the flight.

In accordance with various embodiments, the UAV 12 transmits the flight plan to the traffic management computer 14 when the flight plan is initiated and transmits a completion message when the flight plan is finished. In this way, the traffic management computer 14 is able to track in memory all flight plans in the network 16. In embodiments, the UAV 12 may transmit a current flight plan to a new proximal waypoint computing device 18 at the end of each traffic corridor (or flight leg) 208 so that the new proximal waypoint computing device 18 validates or modifies the flight plan based on potentially changed network performance parameters, which are reflected in update cost vectors in routing tables 44. The UAV 12 will then switch traffic corridors 208 based on the changed flight plan.

In some embodiments, the flight plan will include altitude and latitude commands within the traffic corridor 208. The waypoint computing device 18 can monitor traffic in its own traffic corridor(s) 208 and select altitude and latitude parameters for new traffic to ensure that minimum spacing requirements and throughput are maintained. In examples, the waypoint computing device 18 monitors plural latitude and altitude channels within its own traffic corridor(s) 208 and issues altitude and/or latitude switching instructions to UAVs 12 traversing the traffic corridor 208 to optimize traffic throughput. This monitoring can be performed by receiving global position coordinate broadcasts from each UAV 12 in the traffic corridor 208 and monitoring speed of each UAV with respect to latitude and/or latitude channels of the traffic corridor 208. In other embodiments, the UAVs 12 each broadcast their positions, speeds and possibly other motion parameters (like direction of movement) to all other UAVs in the same traffic corridor 208. The UAVs 12 can freely switch latitude and altitude within the traffic corridor 208 in order to get moving longitudinally within the traffic corridor 208 with the constraint of maintaining a safety buffer from other UAVs 12 within the traffic corridor 208, which is determined based on motion parameters sent from other UAVs 12. In some embodiments, the known in-trail procedure algorithm is used by the UAVs 12 when selecting and switching between altitude and latitude channels within a traffic corridor 208.

Referring to FIG. 2, an exemplary use of the system 10 will be described for a single UAV 12 requesting to travel from a location proximal to building 202 and waypoint computing device 18 A1 to a building 202 and waypoint computing device 18 D4. FIG. 2 illustrates, by way of example, a traffic flow network 200 for an example city having a grid pattern of buildings 202 each having a waypoint computing device 18. More common would be arrangements of buildings 202 in a city (or other urban environment) that do not follow a grid pattern and wherein only some of the buildings 202 have waypoint computing devices 18.

Continuing to refer to FIG. 2, each waypoint computing device 18 has registered with the traffic management computer 14 through an initiate call, as described herein. The traffic management computer 14 maintains a record of all active waypoint computing devices 18 in the network 16 including a description of their locations, the traffic corridors 208 connecting to neighbors and the dimensions of the traffic corridors 208. The UAV 12 sends a request to the proximal waypoint computing device 18 A1 for a flight plan. The request includes at least the destination address (e.g. a global coordinate, a waypoint computing device ID or a building ID) corresponding to building D4. The waypoint computing device 18 A1 determines the lowest cost path from A1 to D4 based on cost vectors included in the routing table 44 for destination D4. The routing table 44 identifies not only the lowest cost vectors from plural alternatives, but also identifies the list of via points in terms of traffic corridors. In the present case, there are many possibilities for travelling from A1 to D4. One route 212 is illustrated in FIG. 2, which, according to the routing table 44, has a higher total cost vector than route 210, which may mean that route 212 would be slower than route 210 despite the routes 210, 212 being equidistant. This may be because of a lack of bandwidth in one of the traffic corridors 208 along the route 212 as compared to the traffic corridors along the route 210. Accordingly, the waypoint computing device 18 A1 returns a flight plan including traffic corridors A1A2, A2A3, A3A4, A3B3, B3C3, C3D3, C3C4 corresponding to route 210.

The UAV 12 receives the flight plan from the waypoint computing device 18 A1 and determines dimensions of the traffic corridors either by looking up updated data from its own database concerning the network 16 (which has been provided and updated by traffic management computer 14) or by retrieving the data from using a request sent to the traffic management computer 14. The dimensions of the traffic corridors 208 and the list of traffic corridors 208 in the flight plan allow the UAV 12 to generate flying commands for various onboard actuators (e.g. steering, lift and thrust) to fly along the designated flight corridors 208 from A1 to D4 along the route 210. The flight is restricted to the dimensions (latitude, longitude and altitude) of each traffic corridor 208. The UAV 12 may send a request (including the current flight plan) to the most proximal waypoint computing device 18 at each transition from one traffic corridor 208 to another (e.g. at the transition from A1A2 to A2A3) along the route 210 to confirm or update the flight plan based on changes to the network performance parameters that will be reflected in the continually updating cost vectors of the routing table 44. When the flight plan is completed, the UAV 12 will send a completion message to the traffic management computer 14 to record the flight plan and its completion status in the memory 28.

Figure 3:
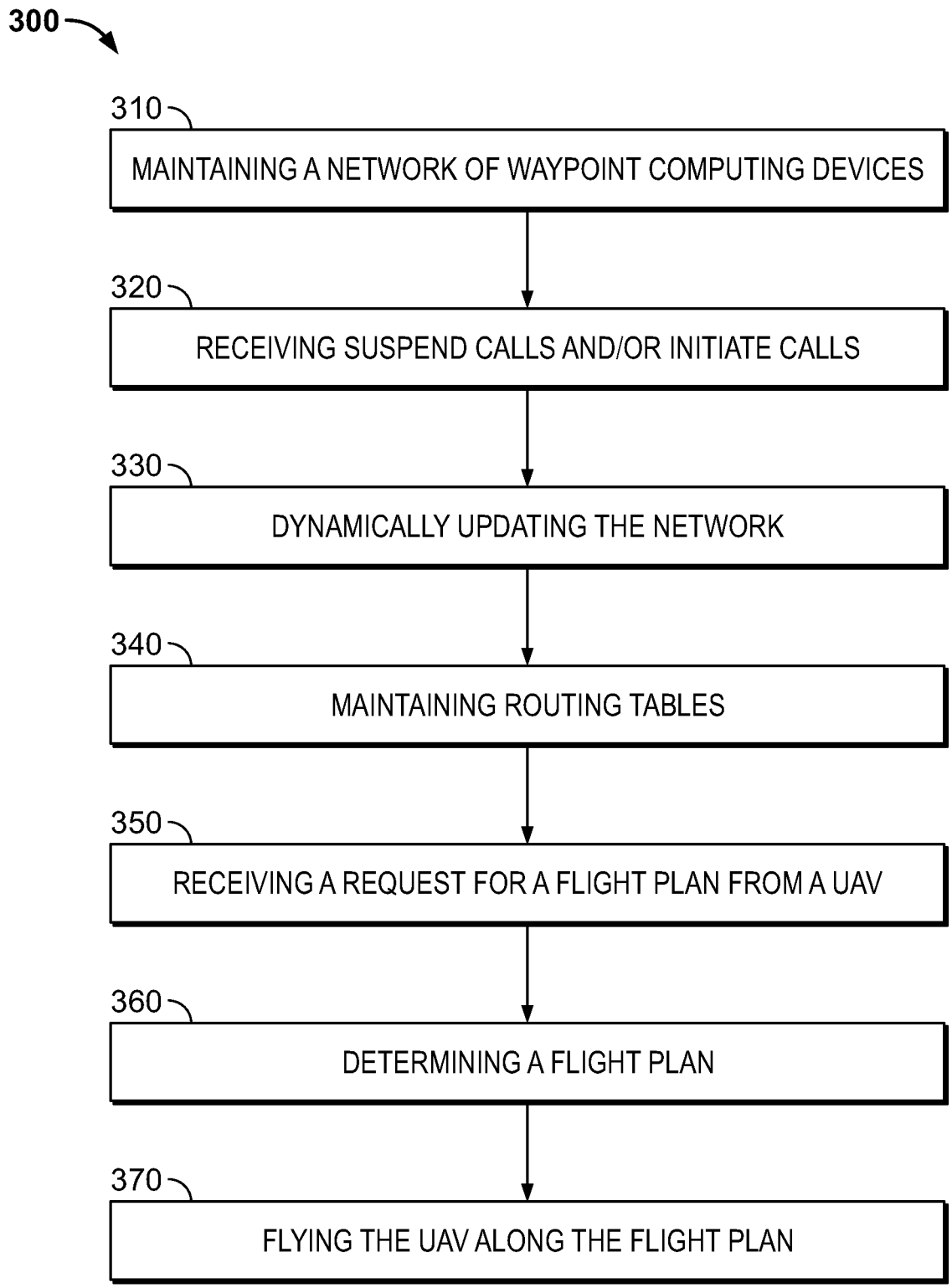
FIG. 3 is a flowchart of a method of traffic management for UAVs, in accordance with various exemplary embodiments.

FIG. 3 illustrates a flowchart of a method 300 for managing UAV traffic, in accordance with various exemplary embodiments. The various tasks performed in connection with method 300 may be performed by software (e.g. program instructions executed by one or more of the processors 27, 29, 34), hardware, firmware, or any combination thereof. That is, method 300 may be executed by the processors 27, 29, 34 as described in the following or by any one or combination of the processors 27, 29, 34 executing computer programming instructions stored in one or more memories 20, 28, 36. For illustrative purposes, the following description of method 300 may refer to elements mentioned above in connection with FIG. 1. It should be appreciated that method 300 may include any number of additional or alternative tasks, the tasks shown in FIG. 3 need not be performed in the illustrated order, and method 300 may be incorporated into a more comprehensive procedure or process having additional functionality not described in detail herein. Moreover, one or more of the tasks shown in FIG. 3 could be omitted from an embodiment of the method 300 as long as the intended overall functionality remains intact.

In embodiments, the method 300 includes a step 310 of maintaining the network 16 of waypoint computing devices 18. The waypoint computing devices 18 are each located on a respective building 202. The network 16 is maintained by the traffic management computer 14 including detailed information on the global location of each waypoint computing device 18 (or its associated building 202), the location of neighboring waypoint computing devices 18 and the dimensions and locations of the traffic corridors 208 connecting each waypoint computing device 18 to its neighbors. It is envisaged that the traffic corridors 208 are linear and are defined with respect to the ending longitudinal positions and have a constant cross-sectional area between the ends. The traffic corridors 208 may have plural lateral and/or altitude channels sized to fit respective UAVs. The traffic corridors 208 may be one way or two-way paths. The UAVs 12 are programmed to obey the dimensional constraints of each traffic corridor as well as any other rules such as directionality, permitted channels, speed, etc.

In embodiments, the method 300 includes a step 320 of receiving, at the traffic management computer 14, suspend calls and/or initiate calls from one or more waypoint computing devices 18. In step 330, the traffic management computer 14 dynamically updates the network 16 by adding the one or more waypoint computing devices 18 to the network 16 in response to the initiate calls and removing the one or more waypoint computing devices 18 from the network 16 in response to the suspend calls. In this way, the traffic management computer 14 keeps a record of the network 16 (including traffic corridors 208) up to date. Accordingly, invalid traffic corridors 208 and waypoint computing devices 18 (e.g. as a result of no landing pad availability or an emergency at the building 202) are kept out of the network 16 to ensure relevancy of all flight plans generated.

In embodiments, the method 300 includes a step 340 of maintaining routing tables 44 at each of the waypoint computing devices. The routing table 44 for any given waypoint computing device 18 includes a cost vector for each route alternative from the given waypoint computing device 18 to all other waypoint computing devices 18 in the network 16. When the network 16 is updated to remove or add a waypoint computing device 18, the routing tables 44 are updated accordingly based on add or remove commands sent from the traffic management computer 14. Further, the waypoint computing devices 18 determine network performance parameters for each of its connecting traffic corridors 208 based at least partly on motion data transmitted from UAVs 12 (e.g. at least position and optionally at least one of speed and acceleration) traversing the traffic corridors 208. The motion data (which is based at least on GPS data from GPS receiver 26 and optionally also speed and other vehicle motion sensors like inertial measurement sensors and image based localization) may be transmitted by the UAVs 12 at periodic intervals during traversal of the traffic corridor 208 or at entry and exit of the traffic corridors 208. When one or more network performance parameters change for one or more traffic corridors 208, the corresponding cost vectors in the routing table 44 are adjusted by the waypoint computing device 18. The waypoint computing device 18 transmits its adjusted routing table 44 to its neighbors, which then adjust their own cost vectors based on the received routing table 44. In this way, the cost vectors (and the minimum cost values for each destination) are propagated by a routing table update propagation algorithm whereby each waypoint computing device 18 sends its changed routing table to each of its neighbors.

In embodiments, the method 300 includes a step 350 of a proximal waypoint computing device 18 receiving a request for a flight plan from a UAV 12. The proximal waypoint computing device 18 is determined based on a detected location of the UAV 12 (e.g. through GPS coordinates obtained by GPS receiver 26 or through other localization techniques such as by comparing images from an onboard camera with mapped images or using ground based location beacons or a combination thereof) and information on the location of the waypoint computing devices 18 in the network 16 obtained from the traffic management computer 14. The proximal waypoint computing device 18 determines a flight plan based on minimizing a total cost vector to the destination, which is obtainable based on the cost vectors included in the routing table 44. The waypoint computing device 18 sends the flight plan to the UAV 12 including identification of each traffic corridor 208 in the flight plan (e.g. using traffic corridor identifiers). The UAV 12 retrieves geography descriptions (e.g. longitudinal end locations, lateral range and altitude range) of the traffic corridors 208 included in the flight plan based on information received from the traffic management computer 14.

In method step 370, the UAV 12 flies the flight plan taking into account the traffic corridor dimensional constraints. In embodiments, the UAV 12 receives from, and transmits to, other UAVs in the traffic corridor 208 motion data (e.g. three-dimensional location and speed). The UAV 12 uses the information received from other UAVs 12 in the traffic corridor in order to maintain predetermined spacing from the other UAVs 12 including when deciding on whether to switch lateral and/or altitude position. In other embodiments, the lateral and/or altitude position occupied by the UAV 12 is set as part of the flight plan determined by, and received from, the waypoint computing device. Further, the UAV 12 sends the flight plan to the next waypoint computing device 18 en route when transitioning from one traffic corridor to another traffic corridor. The next waypoint computing device 18 may adjust the flight plan depending on any changes to the network performance parameters reflected in cost vectors of the routing tables 44. Yet further, the UAVs 12 report completion of the flight plan to the traffic management computer 14 for flight tracking purposes.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A traffic management system for unmanned aerial vehicles (UAVs), comprising:
   waypoint computing devices located on respective buildings;
   at least one processor configured to execute program instructions, wherein the program instructions are configured to cause the at least one processor to:
   define a network of the waypoint computing devices having traffic corridors connecting the waypoint computing devices;
   receive suspend calls and initiate calls from waypoint computing devices;
   dynamically update the network so as to include additional waypoint computing devices and traffic corridor connections based on the initiate calls and to remove from the network waypoint computing devices and associated traffic corridors based on the suspend calls;

receive a request from a UAV for a flight plan, the request including at least source and destination global coordinates;

determining a flight plan for the UAV in response to the request and based on the updated network, wherein the flight plan includes a plurality of traffic corridors connecting the source and destination global coordinates; and providing a response to the UAV including the flight plan, wherein the program instructions are further configured to cause the at least one processor to receive cost vectors from each waypoint computing device in the updated network and to determine the flight plan based at least partly on minimizing a total of the cost vectors, wherein the cost vectors represent speed of traffic through each traffic corridor, wherein each waypoint computing devices is configured to monitor UAV speed of traffic performance for traffic corridors connecting to all of its neighboring waypoint computing devices and to adjust the cost vectors based on the monitored speed of traffic performance in a routing table and wherein the waypoint computing devices are each configured to share the routing table with all of its neighboring waypoint computing devices such that the routing tables are propagated throughout the updated network.

2. The traffic management system of claim 1, wherein the cost vectors are determined by each waypoint computing device with respect to the traffic corridors connecting to neighboring waypoint computing devices and include a measure of at least UAV speed through the traffic corridor.

3. The traffic management system of claim 2, wherein the cost vectors additionally include a measure of at least lateral and/or altitude dimensions.

4. The traffic management system of claim 1, wherein the program instructions are configured to cause the at least one processor to receive the routing tables from the waypoint computing devices and to determine the flight plan based on cost vectors retrieved from the routing tables.

5. The traffic management system of claim 1, comprising the waypoint computing devices, wherein the waypoint computing devices are configured to send a suspend call when all landing pads for the building are occupied.

6. The traffic management system of claim 1, wherein providing the response to the UAV includes defining for each of the plurality of traffic corridors, source building coordinates and destination building coordinates.

7. The traffic management system of claim 1, comprising the UAV, wherein the UAV is configured to transmit positional information to other UAVs and to receive positional information from the other UAVs within a traffic corridor and to switch its lateral position and/or its altitude position in order to maintain predetermined separation distances with the other UAVs.

8. The traffic management system of claim 1, wherein the program instructions are configured to cause the at least one processor to define the traffic corridors to include an altitude range, a latitude range and a longitude range.

9. A method for managing unmanned aerial vehicle (UAV) traffic, the method comprising:

defining, via at least one processor, a network of waypoint computing devices having traffic corridors connecting the waypoint computing devices, each waypoint computing device located on a respective building;

receiving, via the at least one processor, suspend calls and initiate calls from waypoint computing devices;

dynamically updating, via the at least one processor, the network so as to include additional waypoint computing devices and traffic corridor connections based on the initiate calls and to remove from the network waypoint computing devices and associated traffic corridors based on the suspend calls;

receiving, via the at least one processor, a request from an unmanned aerial vehicle (UAV) for a flight plan, the request including at least source and destination global coordinates;

determining, via the at least one processor, a flight plan for the UAV in response to the request and based on the updated network, wherein the flight plan includes a plurality of traffic corridors connecting the source and destination global coordinates; and providing a response to the UAV including the flight plan, wherein the method further comprises receiving, via the at least one processor, cost vectors from each waypoint computing device in the updated network and to determine the flight plan based at least partly on minimizing a total of the cost vectors, wherein the cost vectors represent speed of traffic through each traffic corridor, wherein each waypoint computing device monitors UAV speed of traffic performance for traffic corridors connecting to all of its neighboring waypoint computing devices and adjust the cost vectors based on the monitored speed of traffic performance in a routing table, and wherein the waypoint computing devices each share the routing table with all neighboring waypoint computing devices such that the routing tables are propagated throughout the updated network.

10. The method of claim 9, wherein the cost vectors are determined by each waypoint computing device with respect to the traffic corridors connecting to neighboring waypoint computing devices and include a measure of at least UAV speed through the traffic corridor.

11. The method of claim 10, wherein the cost vectors additionally include a measure of at least lateral and/or altitude dimensions.

12. The method of claim 9, comprising receiving the routing tables from the waypoint computing devices and determining the flight plan based on cost vectors retrieved from the routing tables.

13. The method of claim 9, wherein the waypoint computing devices send a suspend call when all landing pads on the building are occupied.

14. The method of claim 9, wherein providing the response to the UAV includes defining for each of the plurality of traffic corridors, source building coordinates and destination building coordinates.

* * * * *